(12) United States Patent
Hyun et al.

(10) Patent No.: US 9,825,482 B2
(45) Date of Patent: Nov. 21, 2017

(54) ELECTROMAGNETIC BOOSTER FOR WIRELESS CHARGING AND METHOD OF MANUFACTURING THE SAME

(71) Applicant: LG INNOTEK CO., LTD., Seoul (KR)

(72) Inventors: Soon Young Hyun, Seoul (KR); Seok Bae, Seoul (KR); Don Chul Choi, Seoul (KR); So Yeon Kim, Seoul (KR); Ji Yeon Song, Seoul (KR); Jai Hoon Yeom, Seoul (KR); Nam Yang Lee, Seoul (KR); Hyung Eui Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 233 days.

(21) Appl. No.: 14/433,424

(22) PCT Filed: Oct. 4, 2013

(86) PCT No.: PCT/KR2013/008847
§ 371 (c)(1),
(2) Date: Apr. 3, 2015

(87) PCT Pub. No.: WO2014/054893
PCT Pub. Date: Apr. 10, 2014

(65) Prior Publication Data
US 2015/0236545 A1  Aug. 20, 2015

(30) Foreign Application Priority Data

Oct. 4, 2012  (KR) .......................... 10-2012-0109900

(51) Int. Cl.
*H02J 7/02* (2016.01)
*H02J 50/40* (2016.01)

(52) U.S. Cl.
CPC .............. *H02J 7/025* (2013.01); *H02J 50/40* (2016.02)

(58) Field of Classification Search
CPC ...... H02J 7/025; H02J 7/02; H02J 7/00; H02J 17/00; H02F 17/00; H01F 27/28;
(Continued)

(56) References Cited

U.S. PATENT DOCUMENTS 6,597,270 B2 * 7/2003 Takashima .......... H01F 17/0013
336/200
2006/0266435 A1 * 11/2006 Yang ................ G06K 19/07771
148/105

(Continued)

FOREIGN PATENT DOCUMENTS

CN      102592817 A    7/2012
EP       1633017 A1    3/2006
(Continued)

OTHER PUBLICATIONS

Office Action dated Jul. 27, 2016 in Chinese Application No. 201380063905.7.
(Continued)

*Primary Examiner* — Nathaniel Pelton
*Assistant Examiner* — Dung V Bui
(74) *Attorney, Agent, or Firm* — Saliwanchik, Lloyd & Eisenschenk (57) ABSTRACT

Provided is an electromagnetic booster for wireless charging, comprising a magnet part having a magnetic sheet (10) and a coil part (20) disposed on the magnetic sheet, wherein the magnetic sheet is composed of a first magnetic sheet (11) member located at an edge portion and a second magnetic sheet member (12) located in a center portion on the same plane, wherein the first magnetic sheet member and the second magnetic sheet member have different permeability rates from each other.

21 Claims, 4 Drawing Sheets

(58) Field of Classification Search
CPC .......... H01F 27/02; H01F 17/04; H01F 17/00; H01F 41/00; H01F 41/02; H01F 5/00; H01F 5/02; H01F 7/06; H01F 38/14; H01Q 1/50; H01Q 1/00; H04B 5/00
USPC .......... 320/108; 336/119, 200, 84, 221, 232, 336/220, 83; 343/856; 307/104; 455/44.1
See application file for complete search history.

(56) References Cited

U.S. PATENT DOCUMENTS

| | | | | |
|---|---|---|---|---|
| 2009/0243780 | A1* | 10/2009 | Inoue | H01F 1/15366 336/200 |
| 2009/0284341 | A1* | 11/2009 | Okada | H01F 38/14 336/232 |
| 2010/0257725 | A1* | 10/2010 | Akiho | C01G 49/0018 29/600 |
| 2011/0063184 | A1* | 3/2011 | Furumura | G06K 19/07749 343/856 |
| 2011/0234014 | A1 | 9/2011 | Kato et al. | |
| 2012/0074899 | A1 | 3/2012 | Tsai et al. | |
| 2012/0176215 | A1* | 7/2012 | Kudo | H01F 27/34 336/221 |
| 2012/0187904 | A1* | 7/2012 | Tabata | H01F 38/10 320/108 |

FOREIGN PATENT DOCUMENTS

| | | |
|---|---|---|
| EP | 2424072 A2 | 2/2012 |
| EP | 2648274 A1 | 10/2013 |
| JP | 5013019 B1 | 8/2012 |
| KR | 10-1079679 B1 | 11/2011 |

OTHER PUBLICATIONS

International Search Report in International Application No. PCT/KR2013/008847, filed Oct. 4, 2013.
European Search Report in European Application No. 13843799.1.

* cited by examiner

ELECTROMAGNETIC BOOSTER FOR WIRELESS CHARGING AND METHOD OF MANUFACTURING THE SAME

CROSS-REFERENCE TO RELATED APPLICATIONS

This application is the U.S. national stage application of International Patent Application No. PCT/KR2013/008847, filed Oct. 4, 2013, which claims priority to Korean Application No. 10-2012-0109900, filed Oct. 4, 2012, the disclosures of each of which are incorporated herein by reference in their entirety.

TECHNICAL FIELD

Embodiments of the present invention relate to an electromagnetic booster for wireless charging, and more specifically, to an electromagnetic booster for wireless charging, which has a magnetic part composed of a magnetic sheet and a metallic radiator layer, and a method of manufacturing the same.

BACKGROUND ART

A mobile terminal such as a cellular phone is driven by a battery, which can be recharged by its characteristic, and electrical energy is supplied to the battery of the mobile terminal using a separate charging device. Recently, as a wireless charging technology or non-contact charging technology has been developed, it has been utilized for various electromagnetic instruments. This wireless charging technology uses wireless power transmission and reception and is a system which enables the battery to be charged without connecting a separate charging connector to the terminal.

Figure 11:
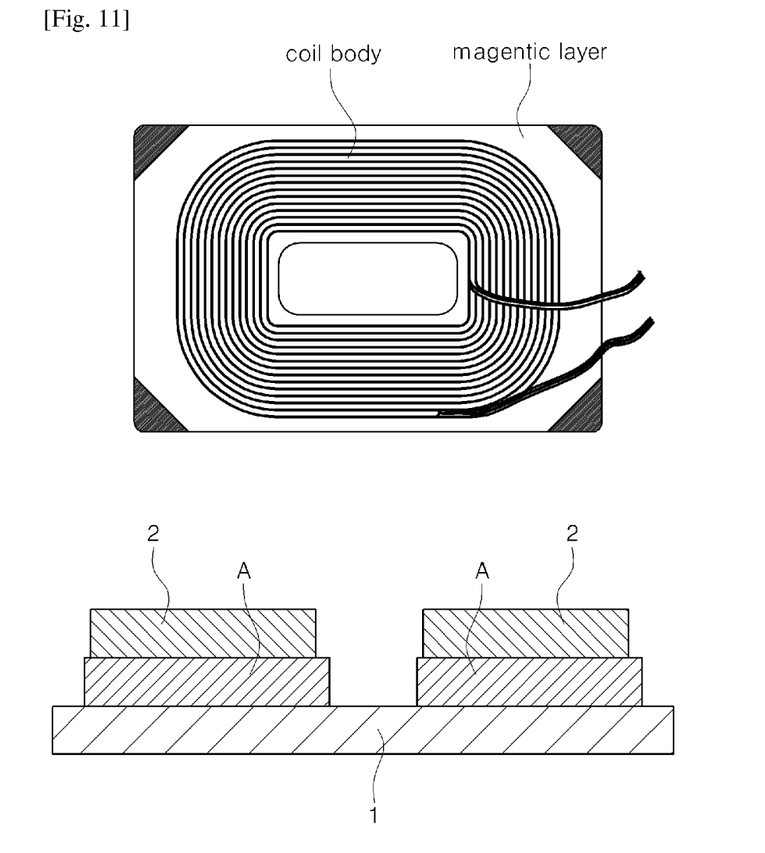
FIG. 11 is a plan view and a cross-sectional view of a conventional electromagnetic booster.

As illustrated in FIG. 11, a conventional booster for wireless charging is configured in a structure in which a magnetic layer 1 composed of a ferrite sintered material, a ferrite composite, a sendust sintered material, a sendust composite or the like, an adhesive layer A formed on the magnetic layer, and a metal coil 2 serving as a radiator and formed on the adhesive layer are laminated. In this conventional booster, since the metal coil 2 is formed on the magnetic layer 1, malfunction which causes frequency interference, offsetting, extinction due to different operating frequencies can be generated. Furthermore, with regard to an adhesive layer A or an adhesive layer and an air layer located between the magnetic layer 1 and the metal coil 2, a permeability rate can be reduced, a loss rate can be increased, and charging efficiency can be reduced. Also, the laminated structure acts as a drag on a slimming design of the wireless charging device.

DISCLOSURE OF INVENTION

Technical Problem

An aspect of the embodiments of the present invention provides an electromagnetic booster for wireless charging, which can prevent malfunction due to frequency interference.

Another aspect of the embodiments of the present invention provides an electromagnetic booster for wireless charging that is capable of improving a bandwidth and a permeability rate and reducing a loss rate, and enables a wireless charging device to be slim in design.

Still another aspect of the embodiments of the present invention provides a method of manufacturing the electromagnetic booster for wireless charging.

Solution to Problem

According to an aspect of the embodiments of the present invention, there is provided an electromagnetic booster for wireless charging, comprising a magnetic material part having a magnetic sheet and a coil part disposed on the magnetic sheet, wherein the magnetic material sheet is composed of a first magnetic sheet member located at an edge portion and a second magnetic sheet member located in a center portion on the same plane, wherein the first magnetic sheet member and the second magnetic sheet member have different permeability rates from each other.

Preferably, according to some embodiments of the present invention, the electromagnetic booster for wireless charging is characterized in that the first magnetic sheet member and the second magnetic sheet member may come into contact with each other or may be spaced apart from each other with an air gap formed therebetween.

Preferably, according to some embodiments of the present invention, the electromagnetic booster for wireless charging is characterized in that the coil part may be composed of a first coil member and a second coil member disposed on each of surfaces of the first magnetic sheet member and of the second magnetic sheet member, and the first coil member and the second coil member may have a thin film coil-like shape.

Preferably, according to some embodiments of the present invention, the electromagnetic booster for wireless charging is characterized in that a concave part corresponding to a shape of the coil part may be formed on a surface of the magnetic sheet, and the coil part may be partially or entirely filled with the concave part in a depth direction of the concave part.

Preferably, according to some embodiments of the present invention, the electromagnetic booster for wireless charging is characterized in that the coil part may be composed of a first coil member and a second coil member disposed on the first magnetic sheet member and the second magnetic sheet member by interposing an adhesive therebetween, and the first coil member and the second coil member may have a thin film coil-like shape.

Preferably, according to some embodiments of the present invention, the electromagnetic booster for wireless charging is characterized in that the first magnetic sheet member and the second magnetic sheet member may have the same or different heights (thicknesses).

Preferably, according to some embodiments of the present invention, the electromagnetic booster for wireless charging is characterized in that the magnetic sheet may be made of a magnetic composition containing a magnetic material and a binder.

Preferably, according to some embodiments of the present invention, the electromagnetic booster for wireless charging is characterized in that the magnetic material may be one element or an alloy composed of a combination of two or more elements selected from the group consisting of Fe, Ni, Co, Mn, Al, Zn, Cu, Ba, Ti, Sn, Sr, P, B, N, C, W, Cr, Bi, Li, Y and Cd, or ferrite.

Preferably, according to some embodiments of the present invention, the electromagnetic booster for wireless charging is characterized in that the magnetic material may be a power having a particle size of 3 nm~50 μm.

Preferably, according to some embodiments of the present invention, the electromagnetic booster for wireless charging is characterized in that the binder may be one resin or a mixture of two or more resins selected from the group consisting of a polyvinyl alcohol (PVA) resin, a polysiloxane resin, an epoxy resin, an acrylate resin, an urethane resin, a polyimide resin and a polyamide resin.

Preferably, according to some embodiments of the present invention, the electromagnetic booster for wireless charging is characterized in that the magnetic composition may contain the magnetic material of 10~95 wt % and the binder of 5~90 wt %.

Preferably, according to some embodiments of the present invention, the electromagnetic booster for wireless charging is characterized in that the magnetic composition may further contain any one or two or more additives selected from the group consisting of a silane coupling agent, an antifoaming agent and a cross linking agent.

Preferably, according to some embodiments of the present invention, the electromagnetic booster for wireless charging is characterized in that the magnetic composition may contain the additives in the range of less than 2 wt %.

Preferably, according to some embodiments of the present invention, the electromagnetic booster for wireless charging is characterized in that the coil part may be made of Ag, Au, Cu or A.

Preferably, according to some embodiments of the present invention, the electromagnetic booster for wireless charging is characterized in that the coil part may have a thickness (height) of 5 µm~1 mm.

Preferably, according to some embodiments of the present invention, the electromagnetic booster for wireless charging is characterized in that the coil part may have a pitch of 5~500 µm.

Preferably, according to some embodiments of the present invention, the electromagnetic booster for wireless charging is characterized in that the coil part may further include a base film BF laminated thereon.

Preferably, according to some embodiments of the present invention, the electromagnetic booster for wireless charging may further include a base film BF laminated on a rear surface of the magnetic sheet.

Preferably, according to some embodiments of the present invention, the electromagnetic booster for wireless charging may include a magnetic sheet and a coil part disposed on the magnetic sheet.

According to another aspect of the embodiments of the present invention, there is provided a method of manufacturing an electromagnetic booster for wireless charging including a magnetic sheet and a coil part disposed on the magnetic sheet, the method including: forming the magnetic sheet with a first magnetic sheet member located at an edge portion and a second magnetic sheet member located in a center portion and having a different permeability rate from that of the first magnetic sheet member on the same plane; and laminating a coil part on the magnetic sheet.

Preferably, according to some embodiments of the present invention, the method is characterized in that the coil part may be formed by plating and etching processes of a metal, and a silk-screening printing process, a pattern coating process or a sputtering process.

Preferably, according to some embodiments of the present invention, the method is characterized in that the laminating of the coil part may include forming a concave part having a shape corresponding to the coil part by engraving a surface of the magnetic sheet; and forming the coil part by putting a metal thin film coil into the concave part.

Preferably, according to some embodiments of the present invention, the method is characterized in that the engraving may be performed using a laser exposure process, a dry etching process after masking, or a stepped pulley formation process with a difference in press between a corresponding area and a non-corresponding area of the engraving.

Advantageous Effects of Invention

Advantageous effects of the electromagnetic booster for wireless charging according to the embodiments of the present invention are that: a wireless charging effect can be maximized; malfunction due to frequency interference can be prevented; it is appropriate for designs having various functions; a bandwidth and a permeability rate can be improved; a loss rate can be reduced; productivity can be improved thanks to a reduction in material and process costs; and a wireless charge device can be designed to be slimmer than before.

BRIEF DESCRIPTION OF DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

BEST MODE FOR CARRYING OUT THE INVENTION

Embodiments according to the present invention will now be described more fully hereinafter with reference to the accompanying drawings. The exemplary embodiments of the present invention may, however, be embodied in many different forms and should not be construed as limited to the embodiments set forth herein. Rather these example embodiments are provided so that this disclosure will be thorough and complete, and will fully convey the scope of the invention to those skilled in the art. Furthermore, when it is determined that specific descriptions regarding publicly known relevant functions or configurations may unnecessarily be beside main points of the present invention, the corresponding descriptions are omitted. It will be further understood that terms used herein should be interpreted as having a meaning that is consistent with their meaning in the context of this specification. With regard to the elements which perform similar functions and operations, like numbers refer to like elements through the specification.

According to an embodiment of the present invention, an electromagnetic booster for wireless charging includes: a magnetic part having a magnetic sheet 10; and a coil part 20 disposed on the magnetic sheet 10.

In the present embodiment of the invention, the magnetic sheet 10 is composed of a first magnetic sheet member 11 located at an edge portion and a second magnetic sheet member 12 located in a center portion on the same plane, and the first magnetic sheet member and the second magnetic sheet member have different permeability rates from each other.

According to the present embodiment of the invention, the magnetic sheet 10 is complexly composed of magnetic materials having different permeability rates from each other so that frequency interference, offsetting, extinction generated due to different operating frequencies can be prevented, thereby preventing malfunction from being generated. Furthermore, the magnetic sheet 10 can be efficiently used in wireless charge products for which various functions are required.

For example, the value of NFC operation frequency is about 13.56 MHz, and the value of wireless charging operation frequency is about 200~300 KHz or 6.78 MHz when it is a magnetic induction type and is about 100~200 KHz when it is a magnetic resonance type.

Figure 1:
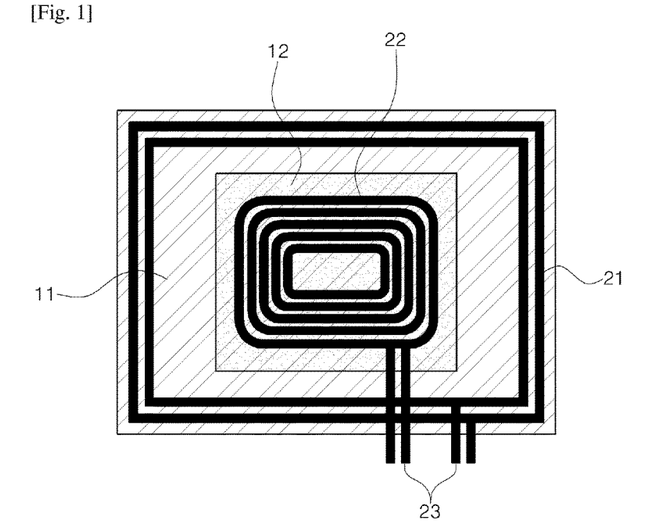
FIG. 1 is a plan view of an electromagnetic booster having a magnetic sheet according to a first embodiment of the present invention.
Figure 2:
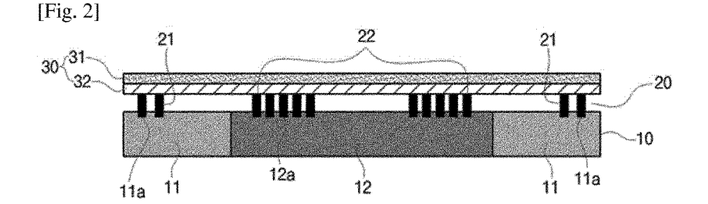
FIG. 2 is a cross-sectional view of FIG. 1.

In the present embodiment of the invention, the first magnetic sheet member and the second magnetic sheet member may be disposed and configured to be come into contact with each other as shown in FIG. 1 and FIG. 2 illustrating a first embodiment of the present invention, or may be disposed and configured to be spaced apart from each other with an air gap 13 formed therebetween.

Figure 3:
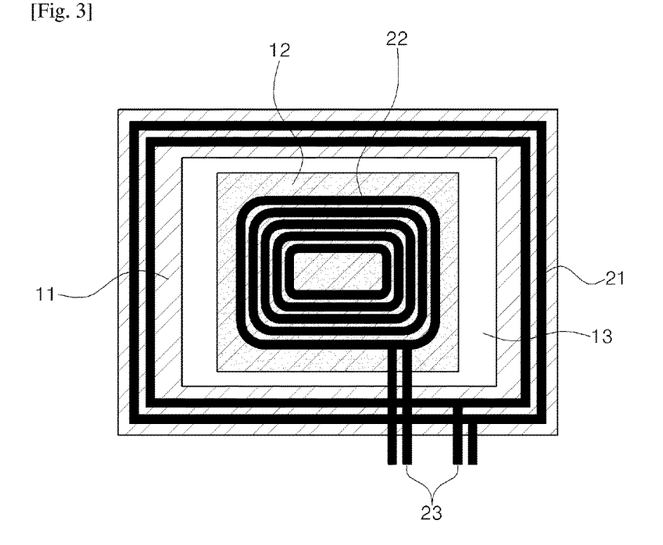
FIG. 3 is a cross-sectional view of an electromagnetic booster having a magnetic sheet according to a second embodiment of the present invention.
Figure 4:
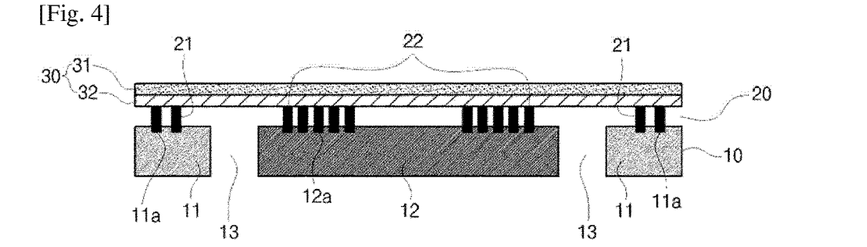
FIG. 4 is a cross-sectional view of FIG. 3.
Figure 5:
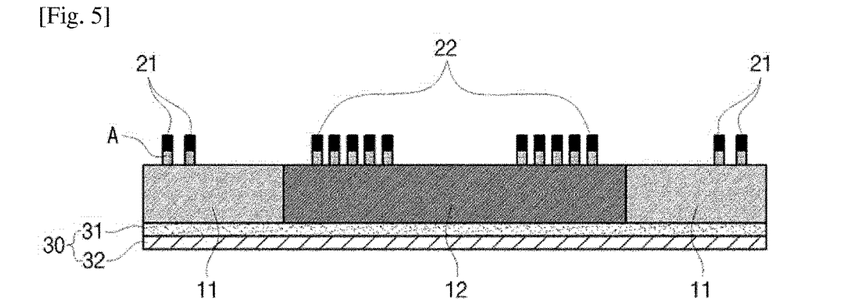
FIG. 5 is a cross-sectional view of an electromagnetic booster having a laminated structure according to a third embodiment of the present invention.
Figure 6:
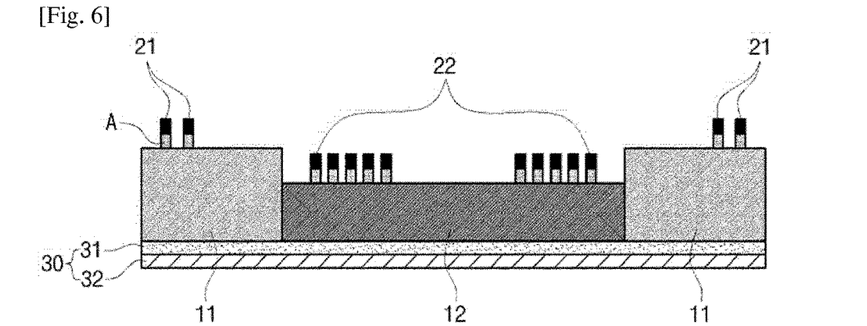
FIG. 6 is a cross-sectional view of an electromagnetic booster having a laminated structure according to a fourth embodiment of the present invention.
Figure 7:
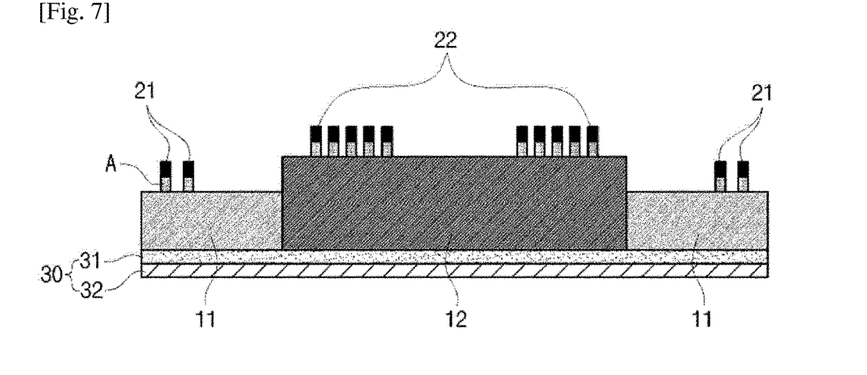
FIG. 7 is a cross-sectional view of an electromagnetic booster having a laminated structure according to a fifth embodiment of the present invention.
Figure 8:
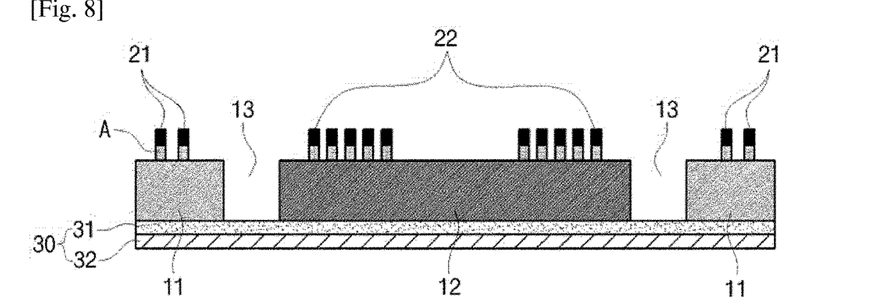
FIG. 8 is a cross-sectional view of an electromagnetic booster having a laminated structure according to a sixth embodiment of the present invention.
Figure 9:
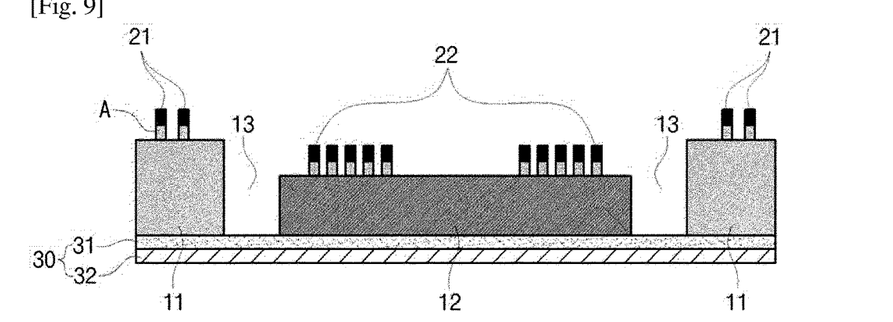
FIG. 9 is a cross-sectional view of an electromagnetic booster having a laminated structure according to a seventh embodiment of the present invention.
Figure 10:
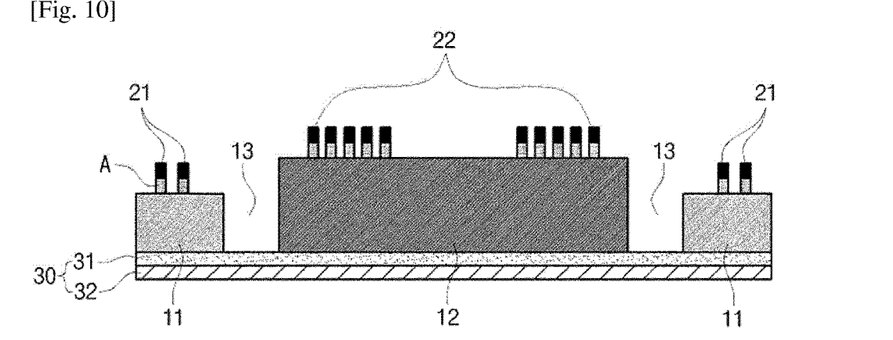
FIG. 10 is a cross-sectional view of an electromagnetic booster having a laminated structure according to an eighth embodiment of the present invention.

Also, the coil part 20 may have a thin film coil-like shape and may be composed of a first coil member 21 and a second coil member 22 disposed on each of surfaces of the first magnetic sheet member 11 and of the second magnetic sheet member 12 as shown in first and second embodiments. In plan views of FIG. 1 and FIG. 3, non-explained reference numeral 23 refers to a conducting wire.

When the coil part 20 is formed on a surface of the magnetic sheet 10, a concave part corresponding to a shape of the coil part 20 is formed on the surface of the magnetic sheet 10, and particularly, it is preferable that the coil part 20 is partially or entirely filled with the concave part in a depth direction of the concave part. In a case where the in-mold type process is used, while a slimmer design can be realized, a thickness of the metal radiator layer 20 closely related to performance upon wireless charging can be maximized. Also, since the metal radiator layer 20 can be formed to be thick as the magnetic sheet 10, a wireless charging effect can be maximized. Also, material and process costs of the coil part as well as those of the magnetic sheet can be reduced, and the slimmer design of the electromagnetic booster can be achieved. In the conventional electromagnetic booster, a thickness of the radiator coil is about 0.35~1.0 mm, whereas in the electromagnetic booster according to the embodiments of the present invention, a thickness of the coil part 20 may be produced in various ranges of μm unit.

Also, in the electromagnetic booster according to some embodiments of the present invention, the coil part 20 may be disposed on the magnetic sheet 10 by interposing an adhesive therebetween as shown in the embodiments of FIGS. 5 to 10.

Also, in the electromagnetic booster according to some embodiments of the present invention, the first magnetic sheet member 11 and the second magnetic sheet member 12 may have the same or different heights (thicknesses). For example, as shown in the fourth and seventh embodiments, the height of the first magnetic sheet member 11 may be formed higher than that of the second magnetic sheet member 12. Alternately, as shown in the fifth and eighth embodiments, the height of the first magnetic sheet member 11 may be formed lower than that of the second magnetic sheet member 12.

In the embodiments of the present invention, the magnetic sheet is made of a magnetic composition containing a magnetic material and a binder.

In the magnetic composition according to the embodiments of the present invention, the magnetic material may be one element or an alloy of a combination of two or more elements selected from the group consisting of Fe, Ni, Co, Mn, Al, Zn, Cu, Ba, Ti, Sn, Sr, P, B, N, C, W, Cr, Bi, Li, Y, Cd and the like, or ferrite, and may be in a powder state in a particle size of 3 nm~50 μm.

Also, in the magnetic composition, the binder is one resin or a mixture of two or more resins selected from the group consisting of a polyvinyl alcohol (PVA) resin, a polysiloxane resin, an epoxy resin, an acrylate resin, a urethane resin, a polyimide resin and a polyamide resin.

In the magnetic composition, with regard to a mixture ratio of the magnetic material and the binder, the magnetic material of 10~95 wt % and the binder of 5~90 wt % may be mixed.

Furthermore, the magnetic composition may contain other general additives well known in the relevant field in the amount of less than 2 wt %. Examples of the additives are a silane coupling agent, an antifoaming agent, a crosslinking agent and the like.

In the electromagnetic booster according to the embodiments of the present invention, the coil part 20 may be made of a metal such as Ag, Au, Cu, Al and the like, a thickness of the coil part 20 may range from 5 μm to 1 mm, a pitch thereof may range from 5 to 500 μm. Here, the pitch means a distance between spiral coils which form the coil part 20, namely, a spaced distance among adjacent spiral coils.

The electromagnetic booster according the embodiments of the present invention may be commercialized by laminating a base film 30 on an assembly of the magnetic sheet 10 and the coil part 20. The base film may be laminated on the coil part 20 or may be laminated on a rear surface (a surface on which the coil part 20 is not formed) of the magnetic sheet 10. In an example illustrated, although the base film 30 is composed a film body 32 and an adhesive layer 31 formed thereon, the base film 30 may be composed of only the film body without the adhesive layer by using an adhesive property which the film itself has.

Hereinafter, a method of manufacturing the electromagnetic booster according to the embodiments of the present invention will be explained.

The electromagnetic booster according to the embodiments of the present invention may be manufactured by forming the magnetic sheet with the first magnetic sheet member located at the edge portion and the second magnetic sheet member located in an center portion and having the different permeability rate from that of the first magnetic sheet member on the same plane, and thereafter, laminating the coil part on the magnetic sheet.

Here, the coil part may be formed using a plating process and an etching process of a metal, a silkscreen printing process, a pattern coating process or a sputtering process.

Also, the laminating of the coil part may include forming a concave part having a shape corresponding to the coil part by engraving a surface of the magnetic sheet, and thereafter, forming the coil part by putting a metal thin film coil into the concave part.

The engraving of the magnetic sheet may be performed using a laser exposure process, a dry etching process after masking, a stepped pulley formation process with a difference in press between a corresponding area and an irrelevant are of the engraving, and the like.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

The invention claimed is:

1. An electromagnetic member for wireless charging, comprising:
   a first magnetic sheet member including a first coil member; and
   a second magnetic sheet member disposed adjacent to the first magnetic sheet member and including a second coil member,
   wherein the first magnetic sheet member and the second magnetic sheet member have different magnetic permeability rates, and
   wherein the second magnetic sheet member is disposed at an inner side of the first magnetic sheet member.

2. The electromagnetic member of claim 1, wherein the first magnetic sheet member and the second magnetic sheet member are disposed to be spaced apart from each other.

3. The electromagnetic member of claim 2, wherein the inner side of the first magnetic sheet member and an outer side of the second magnetic sheet member are spaced apart from each other.

4. The electromagnetic member of claim 1, wherein the first coil member or the second coil member is made of any one material selected from among Ag, Au, Cu, and Al.

5. The electromagnetic member of claim 1, wherein the first coil member or the second coil member has a thickness (height) in a range of from 5 μm to 1 mm.

6. The electromagnetic member of claim 1, wherein the first magnetic sheet member and the second magnetic sheet member have substantially the same thickness.

7. The electromagnetic member of claim 1, wherein the first magnetic sheet member and the second magnetic sheet member are made of a magnetic composition containing a magnetic material, and
   wherein the magnetic material is one element or an alloy of a combination of two or more elements selected from Fe, Ni, Co, Mn, Al, Zn, Cu, Ba, Ti, Sn, Sr, P, B, N, C, W, Cr, Bi, Li, Y, and Cd; or is ferrite.

8. The electromagnetic member of claim 1, wherein the inner side of the first magnetic sheet member and an outer side of the second magnetic sheet member are configured to come into contact with each other.

9. The electromagnetic member of claim 1, wherein the first magnetic sheet member and the second magnetic sheet member have different thicknesses.

10. A mobile terminal for wireless charging, comprising the electromagnetic member of claim 1.

11. An electromagnetic member for wireless charging, comprising:
    a first magnetic sheet member including a first coil member; and
    a second magnetic sheet member disposed adjacent to the first magnetic sheet member and including a second coil member,
    wherein the first magnetic sheet member and the second magnetic sheet member lave different magnetic permeability rates, and
    wherein the first magnetic sheet member is disposed at an edge portion on the same plane as the second magnetic sheet member.

12. The electromagnetic member of claim 11, wherein an inner side of the first magnetic sheet member and an outer side of the second magnetic sheet member are configured to come into contact with each other.

13. The electromagnetic member of claim 11, wherein an inner side of the first magnetic sheet member and an outer side of the second magnetic sheet member are spaced apart from each other.

14. The electromagnetic member of claim 11, wherein the first magnetic sheet member and the second magnetic sheet member have substantially the same thickness.

15. The electromagnetic member of claim 11, wherein the first magnetic sheet member and the second magnetic sheet member have different thicknesses.

16. An electromagnetic member for wireless charging, comprising:
    a base film;
    a first magnetic sheet member including a first coil member; and
    a second magnetic sheet member disposed adjacent to the first magnetic sheet member and including a second coil member,
    wherein the first magnetic sheet member and the second magnetic sheet member have different magnetic permeability rates,
    wherein the first magnetic sheet member and the second magnetic sheet member have different thicknesses, and
    wherein a lower surface of the first magnetic sheet member and a lower surface of the second magnetic sheet member are disposed on the same plane of the base film.

17. The electromagnetic member of claim 16, wherein the base film is disposed in a lower portion of the first magnetic sheet member and the second magnetic sheet member.

18. The electromagnetic member of claim 16, wherein the first coil member or the second coil member has a thickness in a range of from 5 μm to 1 mm.

19. The electromagnetic member of claim 16, wherein the first magnetic sheet member and the second magnetic sheet member are made of a magnetic composition comprising a magnetic material, and
    wherein the magnetic material is one element or an alloy of a combination of two or more elements selected from Fe, Ni, Co, Mn, Al, Zn, Cu, Ba, Ti, Sn, Sr, P, B, N, C, W, Cr, Bi, Li, Y, and Cd; or is ferrite.

20. The electromagnetic member of claim 16, wherein an inner side of the first magnetic sheet member and an outer side of the second magnetic sheet member are configured to come into contact with each other.

21. The electromagnetic member of claim 16, wherein an inner side of the first magnetic sheet member and an outer side of the second magnetic sheet member are spaced apart from each other.

* * * * *